Aug. 5, 1924.

E. R. BURTNETT 1,504,094

INTERNAL COMBUSTION ENGINE

Filed Jan. 21. 1922 4 Sheets-Sheet 4

Inventor
Everett R. Burtnett
By Hazard and Miller
Attorneys.

Patented Aug. 5, 1924.

1,504,094

UNITED STATES PATENT OFFICE.

EVERETT R. BURTNETT, OF LOS ANGELES, CALIFORNIA, ASSIGNOR OF ONE-HALF TO HOMER A. BRUNELL, OF LOS ANGELES, CALIFORNIA.

INTERNAL-COMBUSTION ENGINE.

Application filed January 21, 1922. Serial No. 530,832.

*To all whom it may concern:*

Be it known that I, EVERETT R. BURTNETT, a citizen of the United States, residing at Los Angeles, in the county of Los Angeles and State of California, have invented new and useful Improvements in Internal-Combustion Engines, of which the following is a specification.

My invention relates generally to internal combusion engines, and more particularly to an engine having a duplex inlet and exhaust valve mechanism and means for supercharging the combustion chamber of the engine with gaseous fuel, which arrangements are effective in materially increasing the efficiency of the engine.

The principal object of my invention is to provide an internal combustion engine with greater port area in ratio to the piston displacement than is possible with the present designs of engines, for it is a known and accepted fact that the greater the port area and the freer the passage in ratio to the displacement of the cylinder the greater the rapidity of the admission or discharge of the contents of the cylinder, and by increasing the valve functioning capacity to freely admit or expel a volume proportionate to the displacement of a cylinder of given size it becomes possible to maintain the high volume efficiency at increased engine speeds. As the engine speed is increased the time period for admitting the fuel gases is reduced; therefore, to fill the cylinder at a higher engine speed to the same degree as the present so-called high speed engine cylinders are filled, the fuel inlet and exhaust passages and valve ports must be of increased area in proportion to the cylinder displacement. The present types of engines which deliver the greatest rotary speed and power are provided with four poppet valves in the head of each cylinder, the combined diameters of said valves being as great as the diameter of the cylinder, which arrangement is in keeping with the necessarily small cubic contents of the piston displacement to obtain the desired compression ratio.

The principle of the arrangement as used in present forms of engines is to adapt two of the four valves for the admission of fuel gases and two for the exhaust or outlet of the burnt products of combustion.

It is one of the objects of my invention to provide mechanical means that is entirely separate from but which will cooperate with the four poppet valves in providing a passageway through all four of the poppet valves for the admission of gaseous fuel to the engine and the exhaust of burnt gases therefrom. For instance, on the exhaust or upward stroke of the piston of the engine, the four valves are opened by one cam located between and directly over the four valves, and simultaneously with this action a piston manifold selector located on either side of the cylinder provides a direct passageway communicating with the exhaust pipe, thereby exhausting the burnt gases through all four poppet valves at once. At the end of the exhaust stroke of the piston, the four poppet valves are held open, while the piston manifold selectors are moved to positions to provide direct passages from the inlet manifolds at the sides of the engine with the four valves which are retained in open position. This action of the piston manifold selectors is designed to take place when the cranks of the eccentric shafts located in the crank case on each side of the motor and driven at one-half the speed of the engine are in a plane on a horizontal line and 90° relative to the stroke of the piston manifold selector, which arrangement effects the greatest stroke or speed of travel of said selectors per degree of crank rotation. This arrangement cuts the exhaust passage off suddenly and instantly opens the inlet passage area with the four poppet valves which are in fully open positions.

Therefore, it may be readily seen that since the size of the poppet valves is limited to the area of the cylinder head and in keeping with the desired compression clearance content, my invention permits the use of all four poppet valves for both functions, namely, inlet and exhaust, and provides exactly twice the port area ratio to the piston displacement with the same size valves. Hence the volumetric efficiency of an engine constructed in accordance with my invention will be considerably increased, inasmuch as the cylinder is completely filled with gaseous fuel at much greater engine speeds than is the case in engines now in general use. In my improved engine, the relatively cool fuel gases are admitted through the same poppet valves as the hot burnt gases and products of combustion are expelled from, such action exerting a cooling effect upon the valves and preventing warping, valve sticking, the breaking of springs, and the undue heating of exhaust valves, which limit the compression pressure in present engines to a ratio compatible with safety from pre-ignition. Since the four poppet valves are opened during the exhaust stroke of the piston and closed during its compression stroke, the duration of their being open is for the period of two strokes of the piston instead of two exhaust valves being opened and closed during the exhaust stroke and the two inlet valves being opened and closed during the suction stroke. As a result of this arrangement, the cams can be made so as to operate the valves without impairing the ratio of the port area that is provided. Further, such construction materially increase the life or periods of service of the valves, prevents the breaking of the valve springs and greatly reduces the shocks and vibration in all parts of the valve mechanism. By providing a dependable valve action, the engine may be run indefinitely at relatively high engine speeds and under full load.

As a further means of completely filling the cylinder with gaseous fuel at high engine speeds, two pre-charging cylinder chambers are formed, one on each side of the cylinder directly in front of the cylinders that contain the piston manifold selectors. These cylinders contain pistons that are driven from eccentric shafts on each side which also drive the manifold selectors. During the compression and power strokes of the engine piston, these super-charging pistons are drawn downwardly, thereby creating a displacement within their respective chambers and on reaching their lower dead centers ports formed through the lower portions of the upper cylindrical extensions of these members register with ports arranged in the cylinder walls of these chambers. Inlet manifolds from the carbureters lead to these ports and the fuel gases are drawn into the extended chambers as a consequence of the preceding downward strokes of the supercharging pistons, which action creates an increase in the displacement in the respective chambers. During the exhaust stroke of the engine piston, these supercharging pistons are moved upwardly, thereby closing the ports in communication with the carbureters, and the charge of fuel gas previously admitted is compressed as the engine piston moves through its exhaust and suction strokes. When the engine piston reaches its low center at the end of the suction stroke, it uncovers ports in the periphery of the main cylinder which provide an outlet from the supercharging chambers for the precompressed gases, and the latter enter the combustion chamber above the engine piston.

The pressure of the gases within these super-charging chambers can be controlled by variable clearance plugs located in the heads of the compression chambers and adapted to be adjusted through said heads. Should the main cylinder be filled to atmospheric pressure by the great port area as provided by the combined four poppet valves in the main cylinder head, or should the pressure be below atmospheric, the precompressed gases entering the main cylinder at the end of the suction or inlet stroke will fill the main cylinder to a pressure considerably above that of the atmosphere, thereby providing a positive high volume fuel charge at very high engine speeds. The admission of cool fuel gases each alternate time the engine piston passes over its low center will cool the piston head, which action is favorable to adequate lubrication and, consequently, reduces friction at high piston speeds.

The overhead cam is held in position directly over the center of the cylinders and overhead valves and driven at half engine speed by means of an upright shaft on either end of the engine and with cooperating beveled gears or otherwise. A guide is provided for the block or plate that carries the cam, and means provided between the valve stems and said block or plate for individual adjustment of the poppet valves.

My invention contemplates an engine having a combined port area in ratio to the piston displacement including the volume action of the supercharges of approximately three times that which is possible with the present types of engines having four valves, two for the exhaust and two for the inlet. Further, my improved arrangement of the valves makes it possible to reduce the timing of the valves to a point where the motor will idle without reducing the capacity of the valve functions that are desirable for very high speeds. Further, the arrangement of the cylinder head is such that it may be readily removed and replaced without disturbing any of the manifold selectors or the means for precompressing the fuel charges.

With the foregoing and other objects in view, my invention consists in the features of construction and combination and arrangement of parts hereinafter more fully described and claimed, reference being had to the accompanying drawings, in which Figure 1 is an elevational view of an internal combustion engine of my improved construction, with parts thereof in vertical section in order to more clearly illustrate the means utilized for precompressing the supercharges of gaseous fuel;

Figure 1:
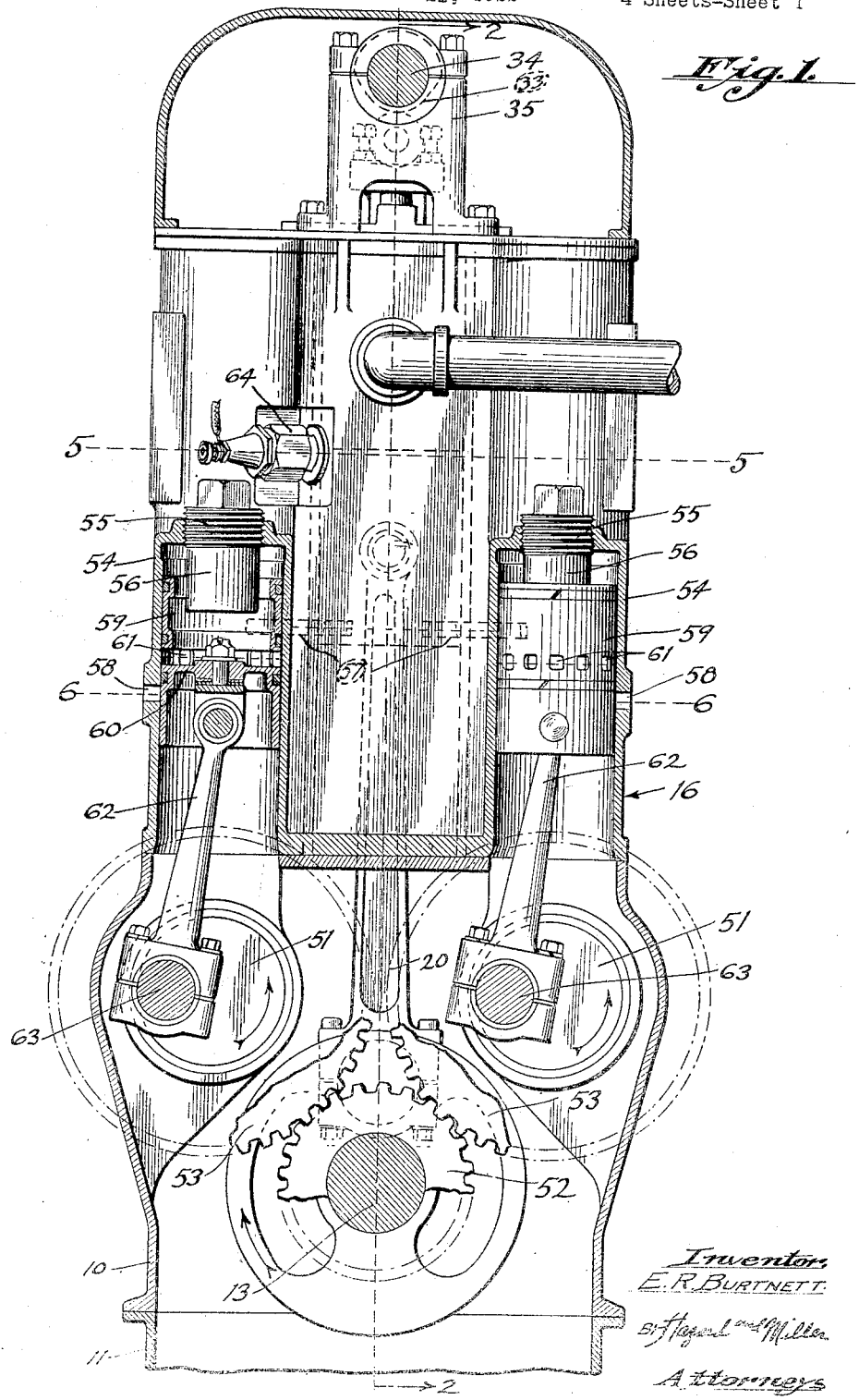
Figure 2:
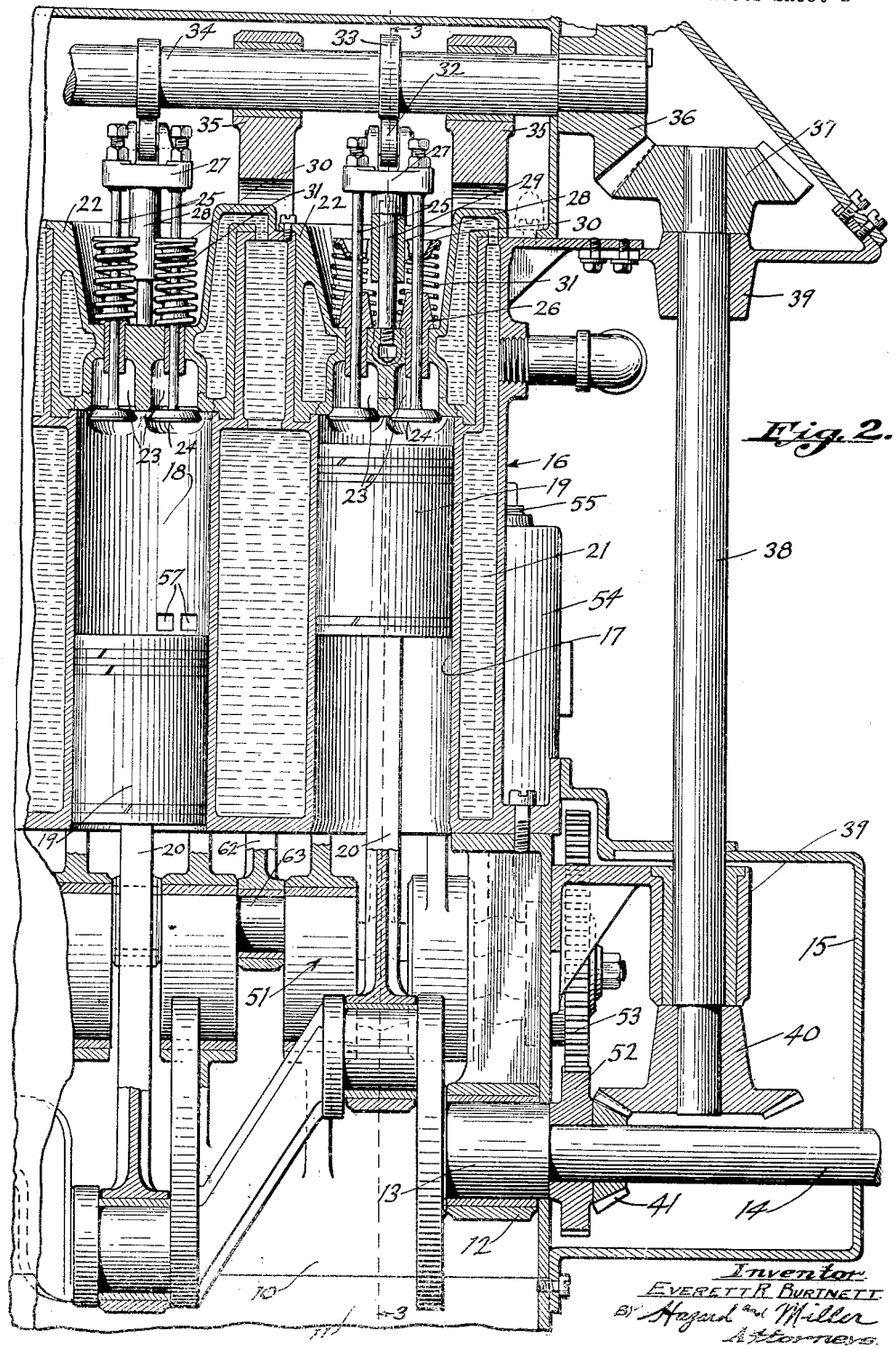
Figure 2 is a vertical section taken approximately on the line 2—2 of Figure 1.
Figure 3:
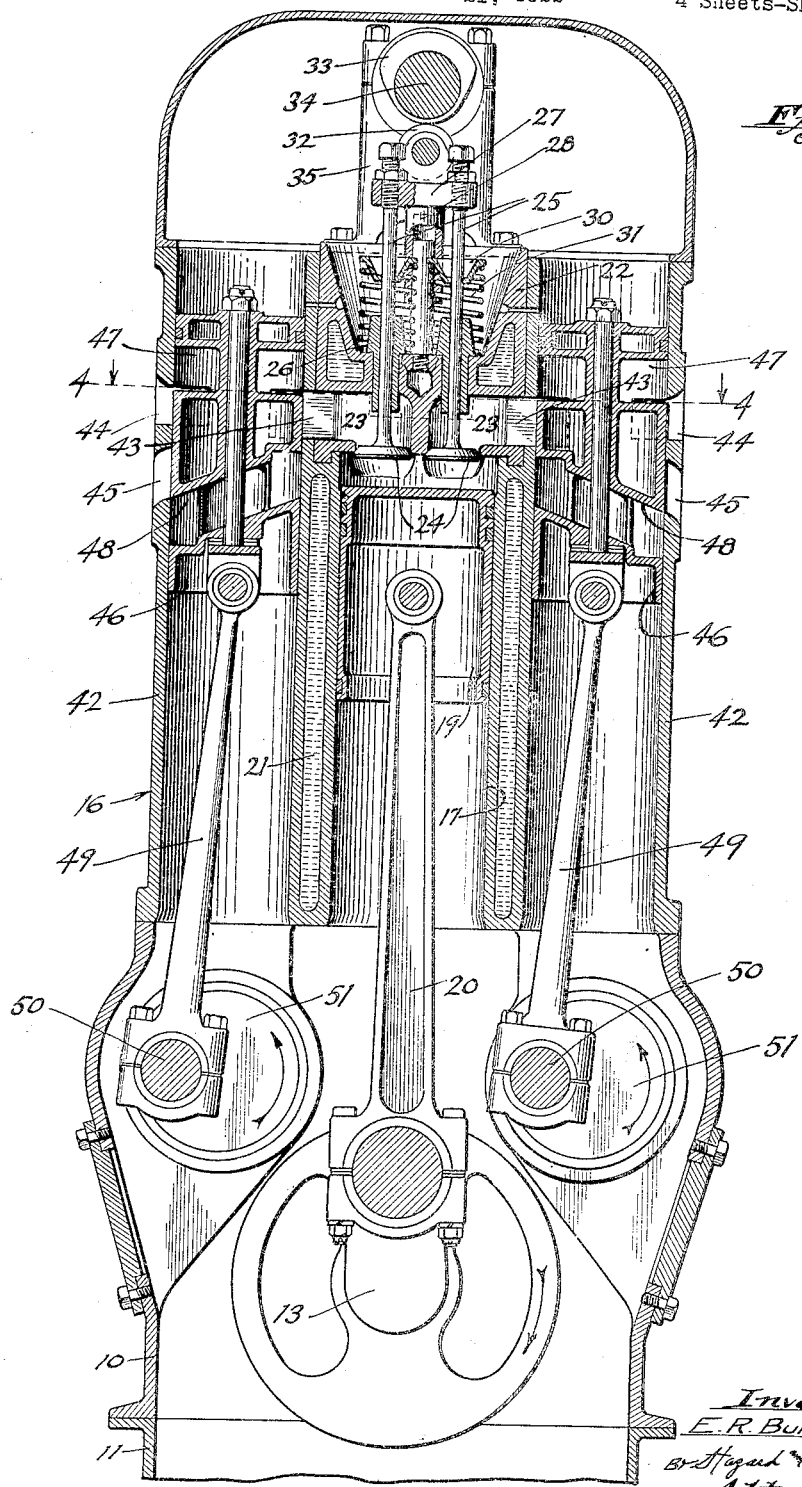
Figure 3 is a vertical section taken approximately on the line 3—3 of Figure 2.
Figure 4:
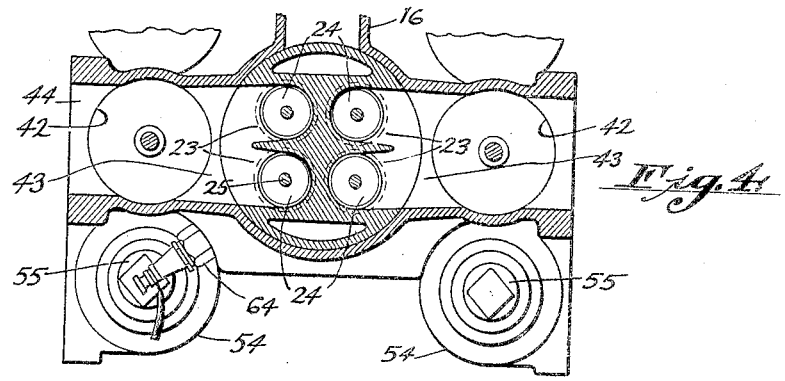
Figure 4 is a horizontal section taken approximately on the line 4—4 of Figure 3.
Figure 5:
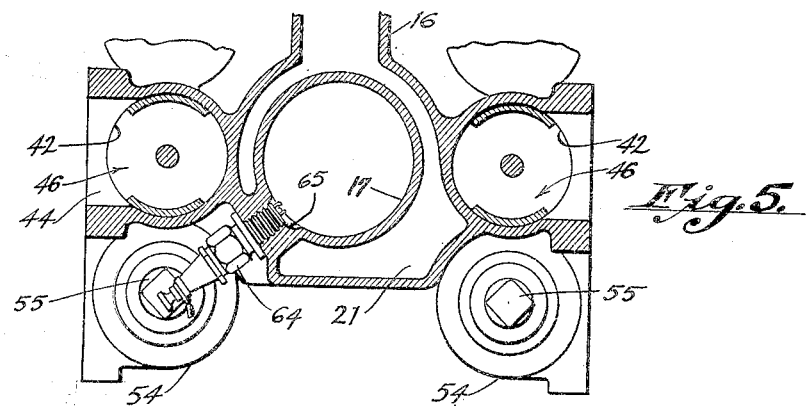
Figure 5 is a horizontal section taken approximately on the line 5—5 of Figure 1.
Figure 6:
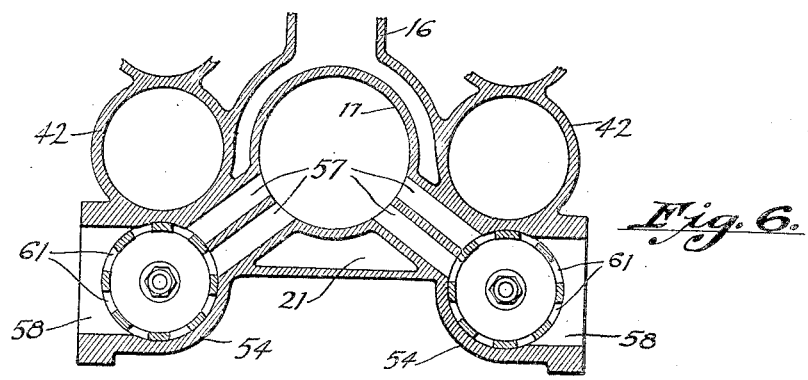
Figure 6 is a horizontal section taken approximately on the line 6—6 of Figure 1.

Referring by numerals to the accompanying drawings, which illustrate a practical embodiment of my invention, 10 and 11 designate, respectively, the upper and lower parts of the crank case of the engine, said parts being preferably cast, and connected to each other in any suitable manner. The ends of the upper part 10 of the crank case are provided with bearings 12 for a crank shaft 13, which latter is provided at one end with an extension 14 that operates within a suitable gear case or housing 15 that is secured to the crank case.

Secured on top of the upper part 10 of the crank case is the cylinder block 16 of the engine, said block being provided with a series of bores 17, the upper portions of which constitute combustion chambers 18. Arranged for reciprocatory movement within each bore 17 is a piston 19, and connecting each piston to a crank of the shaft 13 is a connecting rod 20. The walls of the cylinder block that surround the combustion chambers are provided with connected chambers 21, through which is adapted to circulate a fluid cooling medium, such as water.

The upper end of each combustion chamber in the engine cylinder is closed by a head 22 in the form of a block having hollow walls, through which is adapted to circulate a fluid cooling medium, and formed in the lower portion of each block are two pairs of inverted L-shaped ducts 23, the lower ends of which communicate directly with the upper end of the corresponding combustion chamber, and said lower ends are provided with seats for ordinary poppet valves 24. which latter perform the functions of inlet and exhaust valves. These valves 24 are carried by the lower ends of stems 25 that extend upwardly through suitable bushings 26 in the head 22, and the upper ends of all of the valve stems are adjustably seated in a block or plate 27, which latter is provided with a depending sleeve 28 that is adapted to slide upon a stem 29 that projects upwardly from the center of block 22. Carried by each valve stem 25 is a disk 30, and bearing against the under side thereof is a compression spring 31 that yieldingly retains the corresponding valve 24 upon its seat. Journaled in suitable bearings on each block or plate 27 is a roller 32 and engaging therewith is a cam 33, the latter being carried by a cam shaft 34 that is journaled in suitably located bearings 35. One end of this cam shaft 34 carries a beveled pinion 36 that meshes with a corresponding pinion 37, the latter being secured on the upper end of a vertically disposed shaft 38. This shaft is journaled in suitable bearings 39 that project from the end of the cylinder block and the crank shaft, and the lower end of said shaft which projects into the gear case 15 carries a relatively large beveled pinion 40 that meshes with a smaller beveled pinion 41, the latter being secured to the extension 14 of crank shaft 13.

Formed integral with the cylinder block 16 and arranged on opposite sides of each piston chamber therein are cylinders 42 that are adapted to receive manifold selectors that control the admission of gaseous fuel to the combustion chamber and the exhaust of burnt gases and products of combustion therefrom. Formed through the inner portion of the walls of the cylinders 42 are combined inlet and exhaust ports 43 that communicate with the outer ends of the ducts 23. Formed through the outer portions of the walls of cylinders 42 and substantially in horizontal alinement with the ports 43 are outlet or exhaust ports 44, and formed in said cylinders 42 a short distance below these ports are gaseous fuel inlet ports 45. Arranged for reciprocatory movement within each cylinder 42 is a piston valve 46 that performs the functions of a manifold selector in that it controls the exhaust of burnt gases through the ports 44 and 43 and the admission of gaseous fuel through the ports 43 and 45. The upper portion of this piston valve is provided with an annular port or chamber 47 that is adapted to communicate with the corresponding ports 43 and 44 and formed through the lower portion of the piston valve is an inclined port or passageway 48 that is adapted to establish communication between the corresponding ports 43 and 45.

The piston valves or manifold selectors 46 are reciprocated within their respective chambers by connecting rods 49, the lower ends of the latter being journaled on cranks 50 that are formed on shafts 51, the latter being journaled in suitable bearings in the upper portion of the upper member 10 of the crank case. These shafts 51 are driven from crank shaft 13 at half the speed thereof by means of a relatively small pinion 52 that is fixed on the extension 14 of crank shaft 13 and which meshes with relatively larger pinions 53 that are secured on the ends of said shafts 51.

Formed integral with the lower portion of each cylinder 16 and arranged adjacent to the lower portions of the cylinders 42 are relatively short vertically disposed cylinders 54 in the heads of which are seated screw plugs 55, the latter being provided with relatively large cylindrical portions 56 that project downwardly into the upper ends of the cylinders 54.

Horizontally disposed ports 57 establish communication between the upper portions of the cylinders 54 and the lower portion of the cylinder 17. Formed in the outer portions of the cylinder 54 are gaseous fuel inlet ports 58 to which may be connected suitable gaseous fuel supply pipes (not shown). Arranged for reciprocatory movement within the chambers in the cylinders 54 are cylindrical valves 59, each being provided near its lower end with a horizontally disposed partition 60, and formed through the wall of each valve immediately above this partition is an annular row of ports 61 that are adapted to communicate with the ports 57 when the valve is at its upper limit of movement and with the corresponding inlet port 58 when said valve is at its lower limit of movement. Each valve 59 is connected by a rod 62 to a crank 63 that is formed on the corresponding shaft 51, said crank being arranged so that when the piston is at its lower limit of movement and the corresponding ports 57 are uncovered, the valve 59 is at its lower limit of movement and the ports 61 in register with the open inlet port 58.

Seated in the side wall of each cylinder 16 is a spark plug 64, the terminals of which occupy a shallow pocket 65 that communicates with the combustion chamber in the cylinder, and said spark plug is connected in the usual manner to the timer of the ignition apparatus that is associated with the engine.

The operation of my improved engine is as follows: When piston 19 reaches its high center within the combustion chamber on its compression stroke a charge of gaseous fuel previously drawn into said combustion chamber is compressed above said piston and at the time the latter passes high center or immediately thereafter a spark is produced between the terminals of the plug 64, thereby igniting the compressed charge and forcing the piston 19 downwardly on its power stroke. During this downward or power stroke of the piston the manifold selectors 46 are being drawn downwardly at half the speed of the piston 19, which action is brought about by the arrangement of the two to one gear connections 52 and 53 between the crank shaft 13 and shafts 51. Simultaneously the beveled gear connections between shafts 13 and 38 and between said shaft 38 and the shaft 34 drive said shaft 34 so that when the piston approaches its low center the cam 33 bearing on roller 32 will force block 27 and valves 24 downwardly so that the lower ends of the ducts 23 are open, and they remain open during the succeeding upward or exhaust stroke of the piston. As the manifold selectors are drawn downwardly to their low centers the annular exhaust chambers 47 establish communication between the ports 43 and 44, and on the succeeding upward stroke of the piston 19 the burnt gases and products of combustion will be forced out through ducts 23, ports 43, annular chambers 47 and exhaust ports 44. As the piston 19 reaches its high center on its exhaust stroke the manifold selectors 46 move upward until the annular chambers 47 are out of registration with the ports 43 and 44, and as said piston moves downward on its subsequent or suction stroke ports 48 are moved into position where they register with ports 43 and 45, and as the piston continues in its downward movement a charge of gaseous fuel will be drawn into the combustion chamber past the combined exhaust and inlet valves 24 which valves are held open by the corresponding cam 33. As there are four of these valves a sufficient amount of fuel gas will be admitted to completely fill the combustion chamber below said valves and above the piston.

When the cylindrical valves 59 are at their low centers, charges of gaseous fuel will be drawn through inlet ports 58 into the chambers within the cylinders 54 above the partition 60 of said cylindrical valves, such action being acelerated by the partial vacuum produced within the chambers above the pistons on their preceding downward movements and on the succeeding upward movements of the pistons 59 these charges of gaseous fuel will be compressed within the chambers above the partitions 60. As the cylindrical members reach their high centers, the ports 61 communicate with the inlet ports 57 leading into the combustion chamber, and as the top of the piston 19 reaches its low limit of movement at the end of the suction stroke of said piston, the charges of gaseous fuel which have been precompressed in the upper portion of the cylinders 54 will discharge into the lower portion of the combustion chamber, thereby super-charging said chamber with gaseous fuel, which latter will be compressed on the succeeding upward or compression stroke of piston 19. The cylindrical members 56 may be partially withdrawn from or moved downwardly into the chambers within the upper portions of cylinders 54, thereby varying the capacity of said chambers and, consequently, accurately regulating the volumes of the gaseous fuel that are drawn into and compressed within said chambers.

An internal combustion engine of my improved construction is comparatively simple, may be easily and cheaply produced, and as the combustion chambers of the engine are supercharged with gaseous fuel the engine has a relatively high degree of efficiency.

It will be readily understood that minor changes in the size, form and construction of the various parts of my improved internal combustion engine may be made and substituted for those herein shown and described without departing from the spirit of my invention, the scope of which is set forth in the appended claims.

I claim as my invention:

1. In an internal combustion engine, a cylinder block having a combustion chamber, a pair of manifold selector cylinders arranged to the sides of said combustion chamber, precompression cylinders arranged adjacent to said manifold selector cylinders, there being ducts formed in a head for establishing communication between the chambers in the manifold selector cylinders and the combustion chamber, there being inlet and exhaust ducts formed in the walls of the manifold selector cylinders, and there being ports that establish communication between the chambers within the precompression cylinders and the lower portion of the combustion chamber.

2. In an internal combustion engine, a cylinder block having a combustion chamber, a pair of manifold selector cylinders arranged to the sides of said combustion chamber, precompression cylinders arranged adjacent to said manifold selector cylinders, there being ducts formed in a head for establishing communication between the chambers in the manifold selector cylinders and the combustion chamber, there being inlet and exhaust ducts formed in the walls of the manifold selector cylinders, and there being ports that establish communication between the chambers with the precompression cylinders and the lower portion of the combustion chamber, and blocks adjustably seated in the upper ends of the compression cylinders for the purpose described.

3. In an internal combustion engine, a cylinder block having a combustion chamber, a pair of manifold selector cylinders arranged to the sides of said combustion chamber, precompression cylinders arranged adjacent to said manifold selector cylinders, there being ducts formed in a head for establishing communication between the chambers in the manifold selector cylinders and the combustion chamber, there being inlet and exhaust ducts formed in the walls of the manifold selector cylinders, and there being ports that establish communication between the chambers withing the precompression cylinders and the lower portion of the combustion chamber, pistons arranged for operation within the precompression cylinders, and means at the upper ends of the precompression cylinders varying the area of the chambers above the pistons.

In testimony whereof I have signed my name to this specification.

EVERETT R. BURTNETT.